United States Patent
Lai et al.

(10) Patent No.: US 12,451,132 B2
(45) Date of Patent: Oct. 21, 2025

(54) METHODS AND SYSTEMS FOR DETERMINING CHARACTERISTICS OF A DIALOG BETWEEN A COMPUTER AND A USER

(71) Applicant: Adobe Inc., San Jose, CA (US)

(72) Inventors: Tuan Manh Lai, Lafayette, IN (US); Trung Bui, San Jose, CA (US); Quan Tran, San Jose, CA (US)

(73) Assignee: Adobe Inc., San Jose, CA (US)

( * ) Notice: Subject to any disclaimer, the term of this patent is extended or adjusted under 35 U.S.C. 154(b) by 372 days.

(21) Appl. No.: 18/107,620

(22) Filed: Feb. 9, 2023

(65) Prior Publication Data
US 2023/0197081 A1   Jun. 22, 2023

Related U.S. Application Data

(63) Continuation of application No. 16/889,669, filed on Jun. 1, 2020, now Pat. No. 11,610,584.

(51) Int. Cl.
*G10L 15/00* (2013.01)
*G10L 15/02* (2006.01)
(Continued)

(52) U.S. Cl.
CPC .............. *G10L 15/22* (2013.01); *G10L 15/02* (2013.01); *G10L 15/1822* (2013.01); *G10L 15/183* (2013.01)

(58) Field of Classification Search
CPC ......... G10L 15/16; G10L 25/27; G10L 25/30; G10L 19/005; G10L 19/00; G10L 15/12;
(Continued)

(56) References Cited

U.S. PATENT DOCUMENTS 10,242,330 B2    3/2019  Daya et al.
10,679,613 B2 *  6/2020  Wabgaonkar .......... G06N 3/045
(Continued)

OTHER PUBLICATIONS

U.S. Appl. No. 16/889,669, filed Sep. 30, 2022, "Non-Final Office Action", U.S. Appl. No. 16/889,669, filed Sep. 30, 2022, 8 pages.
(Continued)

*Primary Examiner* — Vu B Hang
(74) *Attorney, Agent, or Firm* — FIG. 1 Patents (57) ABSTRACT

A computer-implemented method is disclosed for determining one or more characteristics of a dialog between a computer system and user. The method may comprise receiving a system utterance comprising one or more tokens defining one or more words generated by the computer system; receiving a user utterance comprising one or more tokens defining one or more words uttered by a user in response to the system utterance, the system utterance and the user utterance forming a dialog context; receiving one or more utterance candidates comprising one or more tokens; for each utterance candidate, generating an input sequence combining the one or more tokens of each of the system utterance, the user utterance, and the utterance candidate; and for each utterance candidate, evaluating the generated input sequence with a model to determine a probability that the utterance candidate is relevant to the dialog context.

20 Claims, 6 Drawing Sheets

(51) Int. Cl.
*G10L 15/22* (2006.01)
*G10L 15/18* (2013.01)
*G10L 15/183* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 15/14; G10L 15/197; G10L 15/1822; G10L 15/183; G10L 15/193; G10L 15/19
See application file for complete search history.

(56) References Cited

U.S. PATENT DOCUMENTS

| | | |
|---|---|---|
| 11,017,037 B2 | 5/2021 | Andreica et al. |
| 11,194,973 B1 * | 12/2021 | Goel ........................ G06N 3/08 |
| 11,269,666 B2 * | 3/2022 | Dua ........................ G06F 3/167 |
| 11,610,584 B2 * | 3/2023 | Lai ...................... G06F 16/3329 |
| 11,775,775 B2 * | 10/2023 | Asai ........................ G06F 40/40 |
| | | 704/9 |
| 2020/0279105 A1 | 9/2020 | Muffat et al. |
| 2021/0365635 A1 | 11/2021 | Olabiyi et al. |
| 2021/0375277 A1 | 12/2021 | Lai et al. |

OTHER PUBLICATIONS

U.S. Appl. No. 16/889,669, filed Dec. 15, 2022, "Notice of Allowance", U.S. Appl. No. 16/889,669, filed Dec. 15, 2022, 8 pages.

\* cited by examiner

METHODS AND SYSTEMS FOR DETERMINING CHARACTERISTICS OF A DIALOG BETWEEN A COMPUTER AND A USER

RELATED APPLICATION

This application is a continuation of and claims priority to U.S. patent application Ser. No. 16/889,669, filed Jun. 1, 2020, entitled "Methods and Systems for Determining Characteristics of a Dialog Between a Computer and a User", the entire disclosure of which is hereby incorporated by reference herein in its entirety.

TECHNICAL FIELD

Various embodiments of the present disclosure relate generally to natural language processing and task-oriented dialog systems and, more particularly, to systems and methods for determining characteristics of dialogs between computer systems and users.

BACKGROUND

Advancements in software and hardware platforms have led to a variety of improvements in systems for artificial agents that can conduct dialogue with users. For example, digital dialogue systems are now able to have basic conversations with users by answering questions or responding to simple verbal interactions. In particular, task-oriented dialog systems have attracted increased attention in recent years because they allow for natural interactions with users to help them achieve simple tasks, such as flight booking or restaurant reservation. Dialog state tracking (DST) is an important component of task-oriented dialog systems. Its purpose is to keep track of the state of the conversation from past user inputs and system outputs. Based on this estimated dialog state, the dialog system then plans the next action and responds to the user.

Tracking the state of a conversation is one of the various characteristics of a dialog that may be used to predict what users have in mind based on conversational inputs, or utterances, that the users provide via speech, text, or other means. Traditional methods for determining one or more characteristics (e.g., state) of a dialog may have some limitations. First, the traditional methods using algorithm models may involve training a separate model for each characteristic, thus making the scalability of these methods a significant issue. Second, some algorithm models for determining one or more characteristics of a dialog may be heavily-engineered and conceptually complex, making these models difficult to implement, debug, and maintain in a production setting.

The present disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining one or more characteristics of a dialog. The present disclosure relates to the use of pre-trained language models, for example, to perform dialog state tracking. In particular, the present disclosure relates to fine-tuning a pre-trained language model to create an efficient but effective model for DST. The embodiments of the present disclosure involve generating an input to a pre-trained language model by combining a dialog context comprising system and user utterances with a plurality of candidates for a dialog state (e.g., a "slot-value pair"). Given a dialog context and a candidate slot-value pair, the model may output a score indicating the relevance of the candidate. Because the model may share parameters across all slot types, the number of parameters may avoid growing with the ontology size. Furthermore, because each candidate slot-value pair may be treated as a sequence of words, the model can be directly applied to new types of slot-value pairs not seen during training. In some embodiments and scenarios, the model need not be retrained every time the domain ontology changes. Additionally, some embodiments of the present disclosure have empirical results demonstrating that those embodiments outperform conventional techniques.

In one aspect, a computer-implemented method for determining one or more characteristics of a dialog between a computer system and user may comprise receiving a system utterance comprising one or more tokens defining one or more words generated by the computer system; receiving a user utterance comprising one or more tokens defining one or more words uttered by a user in response to the system utterance, the system utterance and the user utterance forming a dialog context; receiving one or more utterance candidates comprising one or more tokens, each utterance candidate associated with a characteristic of the dialog between the computer system and the user; for each utterance candidate, generating an input sequence combining the one or more tokens of each of the system utterance, the user utterance, and the utterance candidate; and for each utterance candidate, evaluating the generated input sequence with a model to determine a probability that the utterance candidate is relevant to the dialog context.

In another aspect, a computer-implemented method for determining the relevance of a topic to a dialog between a computer system and user may comprise receiving a system utterance comprising one or more words generated by the computer system; receiving a user utterance comprising one or more words uttered by a user in response to the system utterance, the system utterance and the user utterance forming a dialog context; receiving a plurality of topics potentially relevant to the dialog context; for each of the plurality of topics, generating an input sequence combining the system utterance, the user utterance, and the topic; and for each of the plurality of topics, determining a relevance of each topic to the dialog context based on a probability that the topic is relevant to the dialog context.

In yet another aspect, a system for determining one or more characteristics of a dialog between a computer system and user may comprise a data storage device storing instructions for determining the one or more characteristics of the dialog between the computer system and the user; and a processor configured to execute the instructions to perform a method. The method may comprise receiving a system utterance comprising one or more tokens defining one or more words generated by the computer system; receiving a user utterance comprising one or more tokens defining one or more words uttered by a user in response to the system utterance, the system utterance and the user utterance forming a dialog context; receiving one or more utterance candidates comprising one or more tokens, each utterance candidate associated with a characteristic of the dialog between the computer system and the user; for each utterance candidate, generating an input sequence combining the one or more tokens of each of the system utterance, the user utterance, and the utterance candidate; and for each utterance candidate, evaluating the generated input sequence with a model to determine a probability that the utterance candidate is relevant to the dialog context.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

As described above, DST is an important component of task-oriented dialog systems in the field of natural language processing. In general, DST is used for tracking one or more characteristics of a conversation between a computer system and a user based on past user inputs and system outputs. For example, a system output and a corresponding user output may be linked with each other and together be characterized as a "state" or "context" of the conversation. Based on this estimated dialog state, a language processing system may then plan the next action and respond to the user. In a so-called "slot-based" dialog system, a state of a dialog may be expressed as a set of "slot-value pairs." The set of slots and their possible values may be domain-specific, defined in a domain ontology. For example, slots and their possible values may relate to a particular task, such as booking travel or making a reservation.

Various neural network and other deep learning-based approaches have been proposed for the task of DST. These methods achieve valuable performance on standard DST datasets such as, for example, DSTC-2 or WoZ 2.0 datasets. However, many of these approaches train a separate model for each slot type in a given domain ontology. For example, an ontology representative of restaurants may include different types of slots such as, for example, food, price, area, and so forth. Therefore, the number of parameters may be proportional to the number of slot types, making the scalability of these approaches a significant issue. Second, conventional methods typically operate on a fixed domain ontology. In many conventional approaches, the slot types and possible values are defined in advance and cannot change dynamically. Additionally, state-of-the-art neural architectures for DST may be heavily-engineered and conceptually complex. Each of these models may comprise a number of different kinds of sub-components.

Several pre-trained language models, such as Embeddings from Language Models (ELMo) and Bidirectional Encoder Representations from Transformers (BERT), have been used on many natural language processing tasks. These models comprise natural language processing models pre-trained on unlabeled text corpora. In some embodiments, the present disclosure relates to the use of models such as these to, for example, perform DST. In particular, the present disclosure relates to fine-tuning a pre-trained language model to create an efficient but effective model for DST. The embodiments of the present disclosure involve generating an input to a pre-trained language model by combining a dialog context comprising system and user utterances with a plurality of candidates for a dialog state (e.g., a "slot-value pair"). Given a dialog context and a candidate slot-value pair, the model may generate a score indicating the potential relevance of the candidate. Because in some embodiments the model shares parameters across all slot types, the number of parameters may remain the same regardless of variations in the ontology size. Furthermore, because each candidate slot-value pair may be treated as a sequence of words, the model can be directly applied to new types of slot-value pairs not seen during training. Thus, the model may avoid being retrained when the domain ontology changes. Empirical results show that the proposed model outperforms prior work, as will be discussed in greater detail below.

Figure 1:
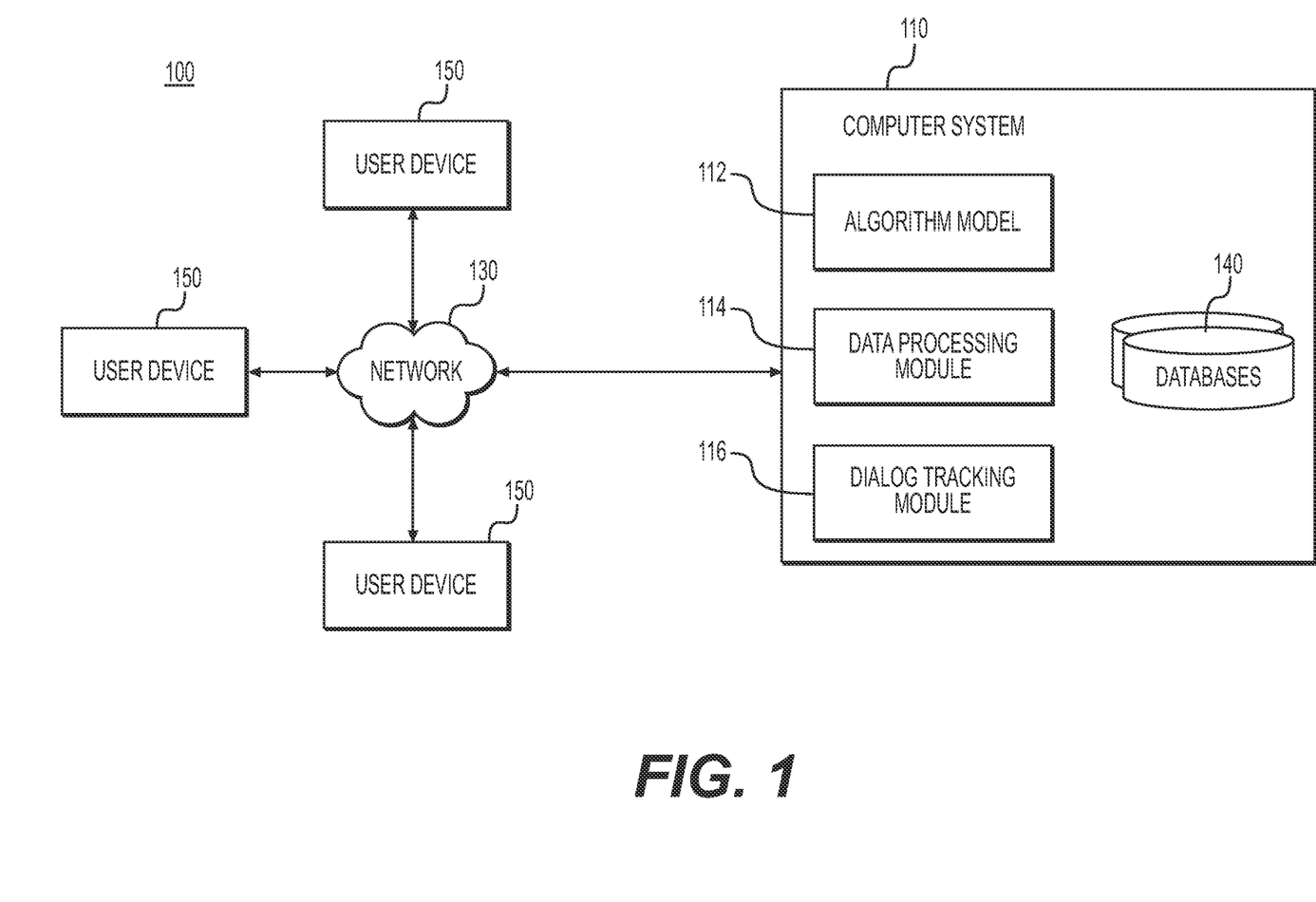
FIG. 1 depicts an exemplary system and network environment comprising a computing system according to one or more embodiments.

Embodiments of the present disclosure will now be described with reference to the appended figures. FIG. 1 is a block diagram depicting an example of a system and network environment 100 in which computer systems consistent with the present disclosure may be implemented. As shown in FIG. 1, the system environment 100 may include a computer system 110, a network 130, and one or more user devices 150.

Computer system 110 may comprise one or more databases 140 and one or more processors configured to perform the methods described herein. The processors of computer system 110 may include one or more modules, models, or engines configured to determine the characteristics (e.g., state) of a dialog between a computer system and a user. In one embodiment, the one or more modules, models, or engines of computer system 110 may include an algorithm model 112, a data processing module 114, and a dialog tracking module 116, each of which may comprise hardware and/or software components stored in/by the computer system 110. The computer system 110 may be configured to utilize one or more modules, models, or engines when performing various methods for determining characteristics (e.g., state) of a dialog between a computer system and a user, as described in this disclosure. In some examples, the computer system 110 may be a cloud computing platform with scalable resources for computation and/or data storage. The computer system 110 implemented on such cloud computing platform may run one or more applications to perform various computer-implemented methods described in this disclosure.

In general, computer system 110 may be configured to receive user inputs from user device(s) 150, process the user inputs using one or more of algorithm model 112, data processing module 114, and/or dialog tracking module 116, and generate system utterances responsive to the user inputs for transmission to user device(s) 150. Algorithm model 112, data processing module 114, and dialog tracking module may be configured to communicate with each other, and any of their functionalities may be shared, combined, and/or separated across each other or any other module, notwithstanding the exemplary functionalities described below for the purposes of illustration.

In some embodiments, algorithm model 112 comprises a plurality of algorithm models trained to perform various natural language processing tasks. As an example, algorithm model 112 may comprise one or more pre-trained machine learning models trained to recognize speech, track dialog state, determine dialog characteristics, generate speech responses, etc. In one embodiment, the algorithm model 112 may include a trained machine learning model for tracking dialog state. In one example embodiment, the trained machine learning model for tracking dialog state may be one or more BERT models. In some embodiments, the pre-trained machine learning models are configured for determining characteristics in addition to the state of a dialog. Details of algorithm model 112 and its trained machine learning model are described in further detail herein.

Data processing module 114 may be configured to monitor, track, clean, process, or standardize data (e.g., system utterances, user utterances, ontology data, reference data, etc.) received by the computer system 110. Data processing module 114 may be configured to convert system utterances and/or user utterances into a plurality of tokens. One or more algorithms of data processing module 114 may be used to clean, process, or standardize the data.

Dialog tracking module 116 may be configured to receive inputs such as user utterances, dialog context, system utterances, algorithm outputs, etc. from user devices 150 or other modules of computer system 110. Such user utterances, system utterances, dialog context, etc. may be represented by computer readable text, which the dialog tracking module 116 may be configured to analyze or retrieve one or more characteristics of a dialog between the computer system and the user. The dialog tracking module 116 may be configured to receive or identify one or more characteristics of a dialog from other modules, engines, or models (e.g., the algorithm model). The dialog tracking module 116 may identify additional characteristics of a dialog.

One or more databases 140 may be configured to store or otherwise aggregate or manage current or historical data associated with a dialog (e.g., historical system utterance or user utterance) received from computer system 110, user device(s) 150, or any external resources. Computer system 110 may be configured to receive data from the one or more databases 140 or other components (e.g., any external data storage medium) of the system environment 100 via network 130. Computer system 110 may further be configured to utilize the received data by inputting the received data into the algorithm model 112 to produce a result (e.g., the probability). Information associated with the result (e.g., a predicted utterance) may be transmitted to user device 150 over network 130. In some examples, the computer system 110 may be referred to as a server system that provides a service including providing the information indicating the received data and/or the result to user device 150.

Network 130 may be any suitable network or combination of networks and may support any appropriate protocol suitable for communication of data to and from the computer system 110 and between various other components in the system environment 100. Network 130 may include a public network (e.g., the Internet), a private network (e.g., a network within an organization), or a combination of public and/or private networks. Network 130 may be configured to provide communication between various components depicted in FIG. 1. Network 130 may comprise one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. Network 130 may be implemented using cell and/or pager networks, satellite, licensed radio, or a combination of licensed and unlicensed radio.

A user device 150 may be any type of computing device configured to operate a client program, also referred to as a user application or third-party application, used to communicate with the computer system 110. This user application may be used to provide information to the computer system 110 and to receive information from the computer system 110. In one embodiment, the user application may be a mobile application that is run on the user device 150. The user device 150 may be a mobile device (e.g., smartphone, tablet, pager, personal digital assistant (PDA)), a computer (e.g., laptop computer, desktop computer, server), or a wearable device (e.g., smartwatches). A user device 150 can also include any other media content player, for example, a set-top box, a television set, a video game system, or any electronic device capable of providing or rendering data. The user device 150 may optionally be portable. The user device may optionally be handheld. The user device 150 may be a network device capable of connecting to a network, such as the network 130, or other networks such as a local area network (LAN), wide area network (WAN) such as the Internet, a telecommunications network, a data network, or any other type of network.

The components of the computer system 110 may be implemented as part of a stand-alone application on a personal computing device or a mobile device. Alternatively, or additionally, the components of the computer system 110 may be implemented in any application that allows creation and delivery of marketing content to users, including, but not limited to, applications in ADOBE CREATIVE CLOUD and/or ADOBE MARKETING CLOUD, such as ADOBE CAMPAIGN, ADOBE ANALYTICS, and ADOBE MEDIA OPTIMIZER. "ADOBE," "CREATIVE CLOUD," "MARKETING CLOUD," "CAMPAIGN," "ANALYTICS," and "MEDIA OPTIMIZER," are registered trademarks of Adobe Systems Incorporated in the United States and/or other countries.

Figure 2:
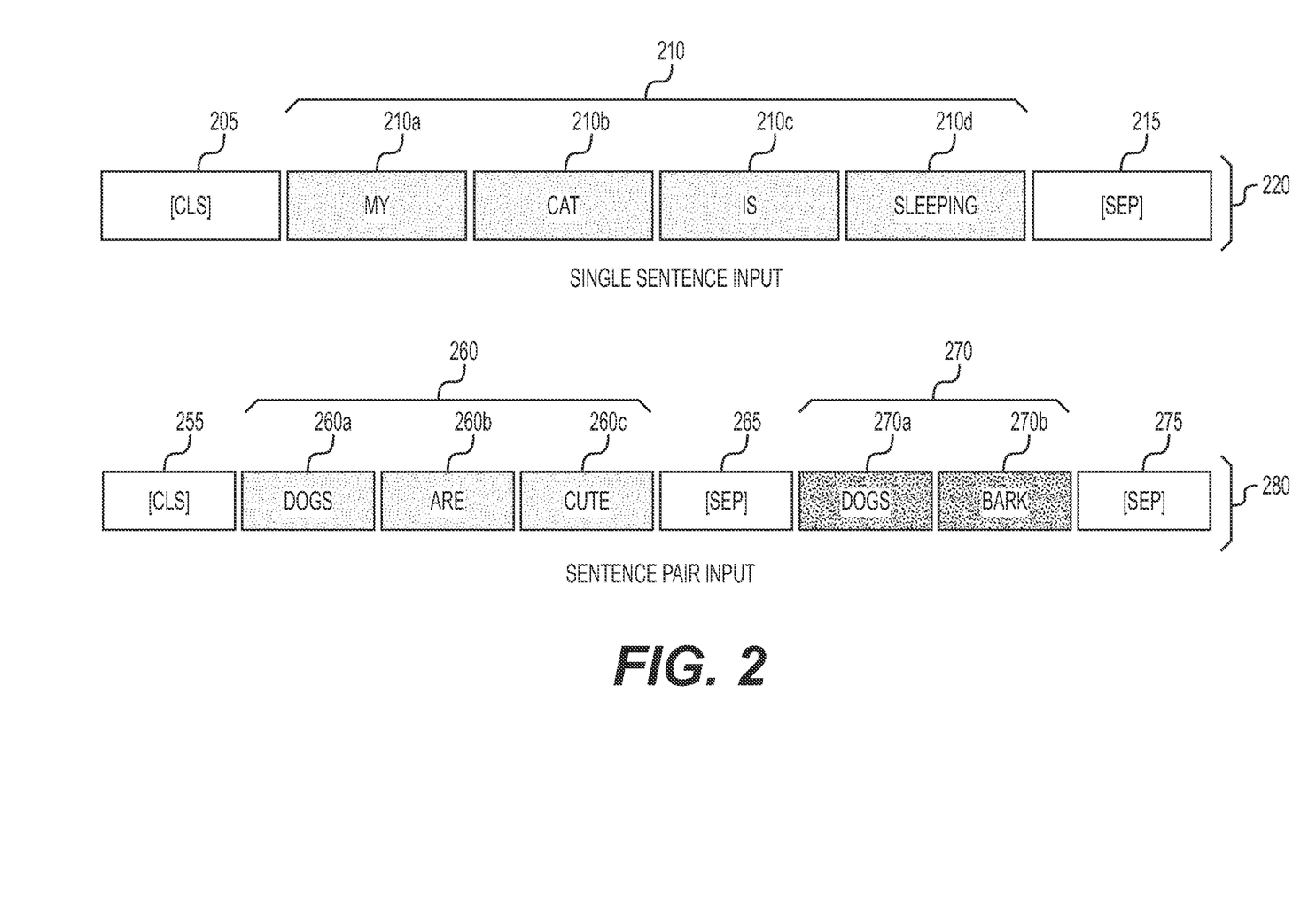
FIG. 2 depicts an exemplary input representation of a pre-trained language model, such as a multi-layer bidirectional transformer encoder, according to one or more embodiments.

FIG. 2 demonstrates an exemplary input representation of a multi-layer bidirectional transformer encoder (e.g., BERT model), according to one or more embodiments. BERT is a language representation model pre-trained on vast amounts of unlabeled text corpora, consisting of multiple transformer layers, each with a hidden size of 768 units and 12 self-attention heads. An input to BERT model is a sequence of tokens (i.e., words or pieces of words) and a corresponding output is a sequence of vectors, one for each input token.

The input representation of BERT is flexible enough that it can unambiguously represent both a single text sentence and a pair of text sentences in one token sequence. In FIG.

2, an exemplary single sentence input 220 (e.g., an input with one sentence) of BERT model is shown. A single sentence input can be used for single text sentence tasks such as, for example, sentiment classification. The exemplary single sentence input 220 comprises a classification token 205, an utterance 210, e.g., "my cat is sleeping," which includes four tokens: [my] 210a [cat] 210b [is] 210c [sleeping] 210d, and a separator token 215.

An exemplary sentence pair input 280 (e.g., an input with more than one sentence) of BERT model is also shown in FIG. 2. A sentence pair input can be used for sentence pair tasks such as, e.g., entailment classification. The exemplary sentence pair input 280 comprises a classification token 255, a first utterance 260, e.g., "dogs are cute," which includes three tokens: [dogs] 260a [are] 260b [cute] 260c, a separator token 265, a second utterance 270, e.g., "dogs bark," which includes two tokens: [dogs] 270a [bark] 270b, and a separator token 275. As shown by the exemplary input representations in FIG. 2, the first token of every input sequence is always a classification token denoted [CLS], and every sentence in an input sequence is followed by a separator token denoted [SEP].

During pre-training, BERT model may be trained using two self-supervised tasks: masked language modeling (masked LM) and next sentence prediction (NSP). In masked LM, some tokens in the input sequence are randomly selected and replaced with a special token denoted [MASK], for the purpose of predicting the original vocabulary identifiers of the masked tokens. In NSP, BERT model may be configured to predict whether two input segments follow each other in the original text. Positive examples are created by taking consecutive sentences from the text corpus, whereas negative examples are created by picking segments from different documents. After the pre-training stage, BERT model can be applied to various downstream tasks such as question answering and language inference, without substantial task-specific architecture modifications.

Figure 3:
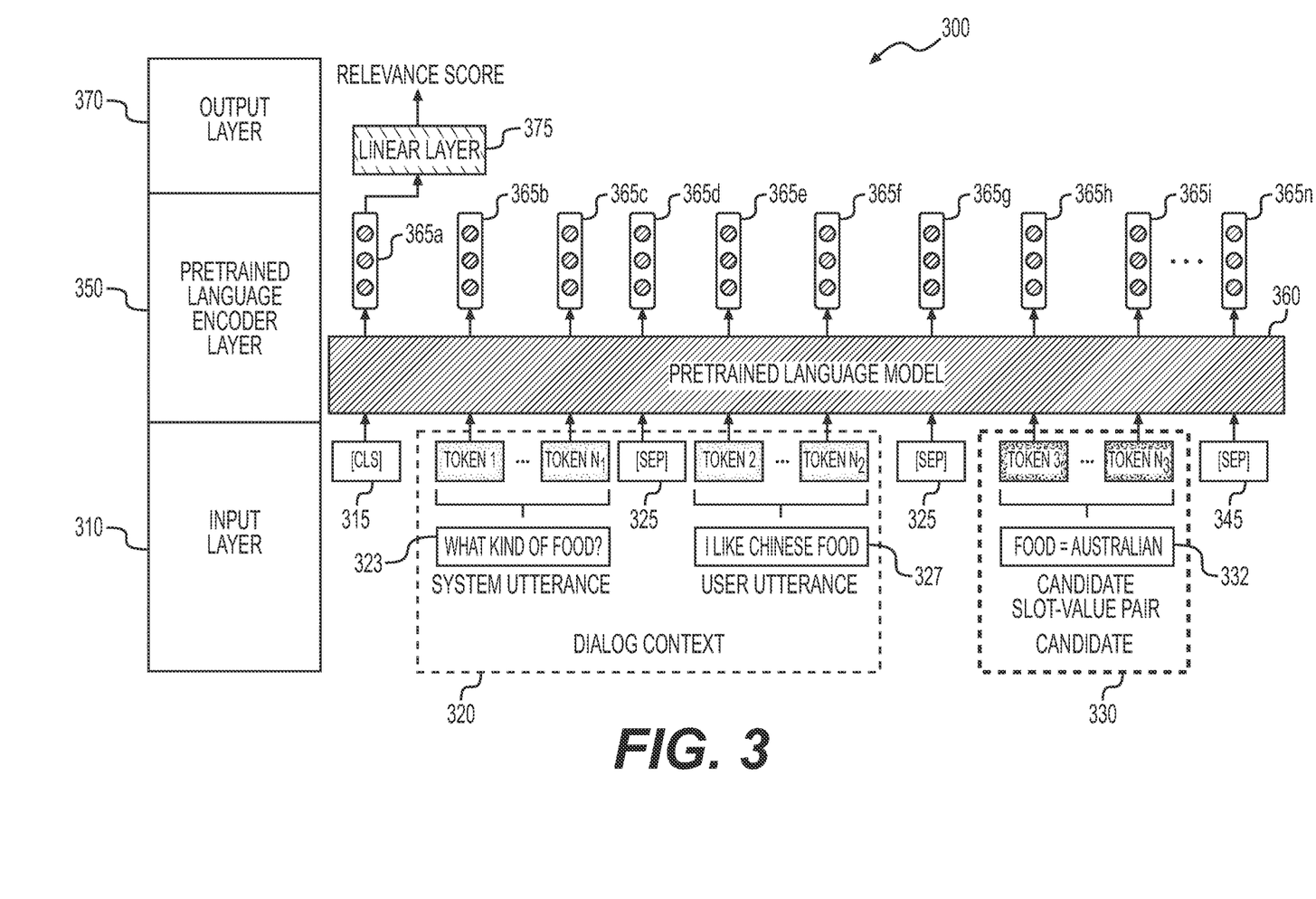
FIG. 3 depicts an exemplary algorithm structure for determining one or more characteristics of a dialog between a computer system and user, according to one or more embodiments.

FIG. 3 depicts an exemplary algorithm architecture for determining one or more characteristics of a dialog between a computer system and user, according to one or more embodiments. In general, architecture 300 may comprise an input layer 310, a pre-trained language encoder layer 350, and an output layer 370. As explained above, an input layer may comprise a sequence of tokens, with a classification token being the first token of the sequence and with each set of tokens representing a sentence being followed by a separator token. More particularly, in the example of FIG. 3, the input layer 310 includes an input sequence comprising: i) a classification token 315, ii) a dialog context 320 comprising a system utterance 323, a separator token 325, and a user utterance 327, iii) a separator token 335, iv) an utterance candidate 330 comprising a candidate slot-value pair 332, and v) a separator token 345.

The dialog context 320 includes a system utterance 323 "What kind of food?" and a user utterance 327 "I like Chinese food," separated by a separator token 325. The system utterance 323 comprises a set of words represented by Token 1 to Token $N_1$ respectively, and the user utterance 327 also comprises a set of words represented by Token 2 to Token $N_2$ respectively. In a dialog context, tokens of a system utterance and tokens of an user utterance may be separated by a separator token, e.g., the separator token 325. The utterance candidate 330 in FIG. 3 comprises a candidate slot-value pair 332 "food=Australian." The candidate slot-value pair 332 is represented by a set of candidate slot-value tokens, i.e., Token 3 to Token $N_3$ respectively.

In FIG. 3, the beginning of the input sequence is marked with a classification token 315 prior to the dialog context 320, and the end of the input sequence is marked with a separator token 345 after the utterance candidate 330. The dialog context 320 and the utterance candidate 330, along with the classification token 315 and separator tokens 325, 335, and 345, are concatenated to form an input sequence, which is passed on to the next layer of the architecture 300.

The input sequence may then be passed onto a pre-trained language encoder layer. As illustrated in FIG. 3, the pre-trained language encoder layer 350 includes a pre-trained language model 360 configured to output a plurality of vectors 365a-365n, n denoting the total number of input tokens in the input sequence. The pre-trained language model 360 may be a BERT model. The tokens in the input sequence are processed through a neural network of the pre-trained language model 360 and are output as a sequence of vectors 365a-365n of a predefined size. Each output vector corresponds to an input token within the input sequence.

Once the pre-trained language encoder layer 350, i.e., its pre-trained language model 360, produces the set of output vectors 365a-365n each corresponding to a respective token in the input sequence, the output layer 370 may process these vectors to generate relevance scores for the utterance candidates. In other words, a relevance score (e.g., a probability that the utterance candidate 330 is relevant to the dialog context 320) is calculated for each vector. To that end, the output layer 370 comprises a linear layer 375 configured to determine a probability between 0 and 1 for each utterance candidate by, for example, applying an activation function such as a sigmoid function. The manner in which the relevance scores may be determined using the architecture 300 will be described in greater detail below, e.g., in reference to FIGS. 4-5.

To evaluate the effectiveness of the proposed architecture (i.e., the architecture 300), an experiment was performed using the proposed architecture in comparison with conventional techniques, on a data set comprising user conversations with dialog systems designed to find suitable restaurants. The ontology for this experiment contained three "informable" slots: food, price, and area. In a typical conversation, a user would first search for restaurants by specifying values for some of these slots. As the dialog progresses, the dialog system may ask the user for more information about these slots, and the user may answer these questions. The user's goal could also change during the dialog. For example, a user may initially want an expensive (e.g., "price=expensive") restaurant but may later want a moderately-priced (e.g., "price=moderate") restaurant. Once the dialog system suggests a restaurant that matches the user criteria, the user may also ask about the values of up to eight "requestable" slots (e.g., phone, address, etc.). The dataset used in the experiment included 600, 200, and 400 dialogs for training, validation, and test phases, respectively. The key metrics for evaluating the performance of the proposed architecture and conventional techniques included joint goal accuracy and turn request accuracy.

Table 1 below shows the test accuracies of the proposed architecture in comparison with those of the conventional techniques. In Table 1, the architecture proposed in the current disclosure is referred to as a distilled BERT-based model. Other conventional techniques included full BERT-based model, StateNet, GCE, GLAD, BERT-DST PS, Neural Belief Tracker—CNN, and Neural Belief Tracker—DNN. Both the distilled BERT-based model and the full BERT-based model outperformed other techniques by a large margin. Further, even though the distilled BERT-based model contemplated by the present disclosure is substantially simpler than the full BERT-based model (i.e., the number of model parameters may be approximately 14 million in the distilled BERT-based model, compared to approximately 110 million in the full BERT-based model), the distilled BERT-based model achieved almost the same results as the full BERT-based model, with the turn request accuracy being slightly higher than the full BERT-based model.

TABLE 1

| Model | Joint goal accuracy | Turn request accuracy |
| --- | --- | --- |
| Distilled BERT-based model | 90.4 | 97.7 |
| Full BERT-based model | 90.5 | 97.6 |
| StateNet | 88.9 | N/A |
| GCE | 88.5 | 97.4 |
| GLAD | 88.1 | 97.1 |
| BERT-DST PS | 87.7 | N/A |
| Neural Belief Tracker - CNN | 84.2 | 91.6 |
| Neural Belief Tracker - DNN | 84.4 | 91.2 |

Figure 4:
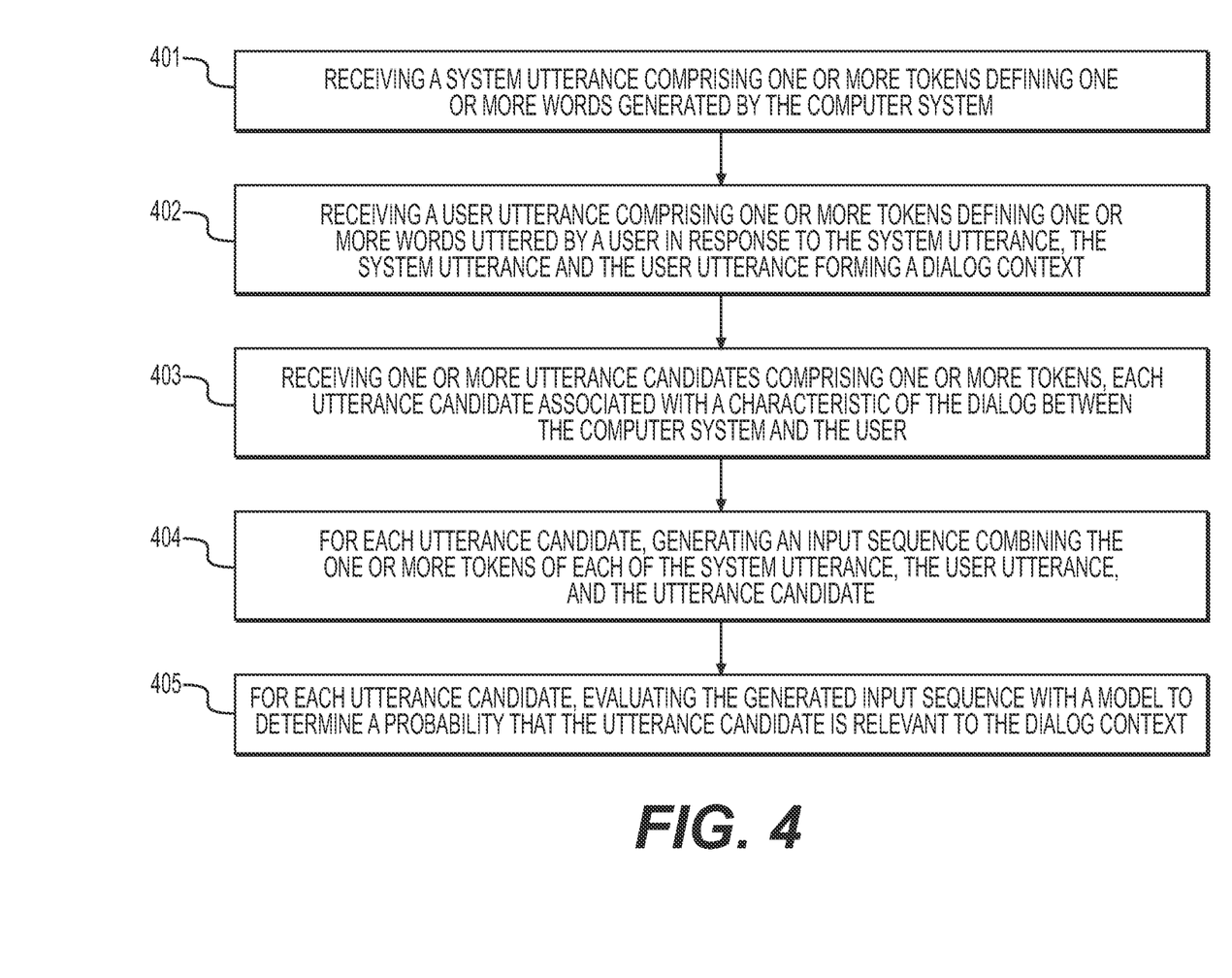
FIG. 4 depicts a flowchart of another exemplary method of determining one or more characteristics of a dialog between a computer system and user, according to one or more embodiments.

FIG. 4 is a flowchart illustrating a method for determining one or more characteristics of a dialog between a computer system and a user, consistent with the architecture of FIG. 3, according to one or more embodiments of the present disclosure. The method may be performed by a computer system, for example computer system 110.

In step 401, processing circuitry, e.g., in computer system 110 receives a system utterance comprising one or more tokens defining one or more words generated by the computer system. An utterance may include any type of conversational input including, but not limited to, speech, text entry, touch, and gestures. An utterance may refer to any uninterrupted chain of words (e.g., spoken or written). For example, an utterance may include one or more words that form one or more sentences in the form of statements and/or questions. An utterance may also, or alternatively, refer to one or more words that do not form a sentence, but instead form a sentence fragment, a description of a particular object, and/or a reply to a question. Indeed, an utterance can refer to one or more words combined in a sequential nature. System utterance may be any utterance that is provided by a machine or system (e.g., a computer system) instead by a human being (e.g., a user).

The processing circuitry may convert the system utterance into one or more tokens that define one or more words of the system utterance. Tokens may be generated through a process of breaking up the given text into smaller units such as tokens. The tokens may include words, numbers, or punctuation mark. In one example, if a system utterance is "What kind of food," then each of the one or more tokens may represent a word in the system utterance. In this case, there may be four tokens, including the first token defining "what," the second token defining "kind," the third token defining "of," and the fourth token defining "food." In some examples, the one or more tokens may include special tokens, such as tokens representing separation between sentences (e.g., a separator token), start of an utterance (e.g., a classification token), end of an utterance, and/or any other special token to represent any other special characteristics of the utterance or dialog.

In step 402, processing circuitry, e.g. in the computer system 110, receives a user utterance comprising one or more tokens defining one or more words uttered by a user in response to the system utterance. Again, each token may define one or more words, or a part of a word. For instance, if the system utterance is "Which part of the town?," the user utterance may be "North area of the town," which answers the question raised in system utterance. The system utterance and the user utterance, in this example, together form a dialog context. In this case, the dialog context includes a plurality of utterances, including the system utterance and the user utterance. An utterance, either a system utterance or a user utterance, may include an identifiable boundary, which can be used to break multiple utterances of a dialog context into discrete utterances. An example of boundaries of an utterance in spoken dialog may be silence. Another example of boundaries of an utterance may be a carriage return, end mark punctuation that signals an end to a sentence, and/or other designated characters. The user utterance may be received by the computer system 110 from the user device 150. When forming the dialog context, the processing circuitry may combine the tokens of the system utterance and the tokens of the user utterance. The processing circuit may also place a separator token between the tokens of the system utterance and the tokens of the user utterance. The combining the tokens of the system utterance and the tokens of the user utterance may include placing the tokens of the system utterance before the tokens of the user utterance. In some other embodiments, the combining the tokens of the system utterance and the tokens of the user utterance may include placing the tokens of the system utterance after the tokens of the user utterance.

In step 403, processing circuitry, e.g., in the computer system 110, receives one or more utterance candidates comprising one or more tokens. Each utterance candidate may be associated with a characteristic of the dialog between the computer system and the user. The characteristics of the dialog may include a state of a dialog, a topic or subject matter of the dialog, a category of the dialog, a part of speech of the dialog, or any other category associated with the dialog useful to generating a response to the user utterance. In one embodiment, a state of a dialog includes a representation of what one or more participants in a dialog (e.g., a user) have in mind based on what is expressed through utterances of the dialog. A state of a dialog can be represented as a list of slot-value pairs. The slot may include a general category (e.g., a geographical area or a type of food), while the value may be a value or a description associated with the slot or what the dialog participants have in mind. An exemplary slot-value pair may include "food=Chinese," wherein the slot is the category of food and value is "Chinese food." The characteristic of a dialog may include information associated with how a user is trying to interact with the computer system (e.g., a user is requesting alternatives or wants to end a dialog).

The processing circuitry may receive the utterance candidates from one or more databases 140. In one embodiment, the utterance candidate is a candidate slot-value pair. Each candidate slot-value pair may comprise one or more tokens defining a domain slot and a possible slot value of the candidate slot-value pair. The domain slot may be a characteristic of the dialog between the computer system and the user. The possible slot value of the candidate slot-value pair may be a value (e.g., numerical value or a description) associated with the characteristic of the dialog between the computer system and the user. The candidate slot-value pairs may include a domain slot that represents a general category (e.g., FOOD) and a possible value that represents, more specifically, what the dialog participant (e.g., a user) has in mind (e.g., "Korean"). A candidate slot-value pair may refer to a set of slot-value pairs prior to assigning the set as a predicted or calculated state of a dialog of an utterance. As a candidate slot-value pair, additional slot-value pairs can be added to the set of slot-value pairs. The candidate slot-value pair can be removed from the set of slot-value pairs prior to assigning the set as a predicted state of dialog. Each candidate slot-value pair may include one or more tokens defining a domain slot and possible slot value having potential relevance to the dialog context. For instance, if the dialog context includes "I like Chinese food," and the candidate slot-value pair may include "food=Australian," which is relevant to the dialog context.

In step 404, processing circuitry, e.g., in the computer system 110, generates an input sequence combining the one or more tokens of each of the system utterance, the user utterance, and the utterance candidate. In generating the input sequence, the processing circuitry may place the tokens of the dialog context before the tokens of the utterance candidate; place a classification token before the dialog context; and place a separator token between the tokens of the dialog context and the tokens of the utterance candidate. In some other embodiments, there may be different orders or sequences in which to place the tokens of the dialog context, the tokens of the utterance candidate, the classification token, and the separator token.

In one embodiment, the input sequence generated for each utterance candidate begins with a classification token and comprises a separator token between each of the system utterance tokens, the user utterance tokens, and the utterance candidate tokens. The separator token may represent separation between sentences or words, start of an utterance, or end of utterance. The classification token may be used to define or classify one or more feature vectors. In one example, an output vector corresponding to the classification token may be used as the aggregate representation of the original input. No prediction may be involved with the separator token or the classification token. The special tokens (e.g., classification token and separator token) may be excluded from training. In one example, for a dialog context including a system utterance such as "what kind of food" and a user utterance such as "I like Chinese food," the input sequence to the model may be [CLS][What] [kind] [of] [food] [SEP] [I] [like] [Chinese] [food]. In this case, [CLS] may be a classification token, [What] [kind] [of] [food] may be four tokens of the system utterance, [I] [like] [Chinese] [food] may be four tokens of the user utterance, and [SEP] may be a separator token. In another example, for a dialog context including a system utterance such as "What kind of food," a user utterance such as "I like Chinese food," and an utterance candidate such as "food=Korean," the input sequence to the model may be [CLS][What] [kind] [of] [food] [SEP] [I] [like] [Chinese] [food] [SEP] [food] [Korean]. In this situation, [CLS] may be a classification token, [What] [kind] [of] [food] may be tokens of the system utterance, [I] [like] [Chinese] [food] may be tokens of the user utterance, [food] [Korean] may be tokens of the utterance candidate, and [SEP] may be a separator token.

In step 405, for each utterance candidate, processing circuitry, e.g., in the computer system 110, evaluates the generated input sequence with a model to determine a probability that the utterance candidate is relevant to the dialog context. In evaluating the generated input sequence with the model, the processing circuitry may input the generated input sequence of combined tokens into a machine learning model and calculate the probability that the utterance candidate is relevant to the dialog context via the machine learning model.

The machine learning model may include a regression-based model that accepts the tokens of system utterance, the tokens of user utterance, the special tokens (e.g., classification token and separator token), the tokens of utterance candidates, and/or the tokens of dialog context as input data. The trained machine learning algorithm may be part of the algorithm model 112. The trained machine learning algorithm may be of any suitable form, and may include, for example, a neural network. A neural network may be software representing human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The trained machine learning algorithm may compute the probability that the utterance candidate is relevant to the dialog context as a function of the vectors associated with the tokens of system utterance, the tokens of user utterance, the special tokens (e.g., classification token and separator token), the tokens of utterance candidates, the tokens of dialog context, or one or more variables indicated in the input data. The one or more variables may be derived from the feature vectors associated with the tokens of system utterance, the tokens of user utterance, the special tokens (e.g., classification token and separator token), the tokens of utterance candidates, and/or the tokens of dialog context. This function may be learned by training the machine learning algorithm with training sets. The machine learning algorithm may be trained by supervised, unsupervised or semi-supervised learning using training sets comprising data of types similar to the type of data used as the model input.

In one embodiment, the machine learning model includes a multi-layer bidirectional transformer encoder. The multi-layer bidirectional transformer encoder may be the BERT model explained above, e.g., in paragraphs [0030] to [0033]. The machine learning model may be trained to output a vector for each input token of the input sequence, each output vector contributing to the calculated relevance of the utterance candidate to the dialog context. The dialog context may comprise a system utterance from the previous turn and the user utterance from the current turn. A turn may be a part of a conversation between the computer system and user, including, for example, a question from the computer system and an answer from the user in response to the question. The system utterance and the user utterance may be separated by a [SEP] token. The utterance candidate may be represented as a sequence of tokens (words or pieces of words). The dialog context and the utterance candidate may be concatenated into the input sequence and then passed to a model (e.g., a BERT model).

In one embodiment, the step 405 of determining the probability involves the processing circuitry transforming each token of the combined tokens to a feature vector; multiplying the feature vector with a transformation matrix; adding a bias term to the multiplied feature vector; and multiplying a sum of the bias term and the multiplied feature vector with a function. The function may be a sigmoid function that converts the sum to a probability between 0 and 1. The feature vector may be an expression or representation of a word or utterance in vector space. Particularly, a feature vector can refer to a representation in vector space that indicates information associated with the combined tokens or utterance. In one example, the output vectors may be ($h_1$, $h_2$, ..., $h_M$), where M may denote the total number of input tokens (including special tokens such as [CLS] and [SEP]). Based on the output vector corresponding to the classification token-[CLS] (e.g., $h_1$) the probability that the utterance candidate is relevant to the dialog context may be expressed in an equation such as $y=\sigma(Wh_1+b) \in \mathbb{R}$, where the transformation matrix W and the bias term b may be model parameters, and a may denote the sigmoid function.

The method of FIG. 4 may further comprise a step of determining the one or more characteristics of the dialog between the computer system and the user based on the one or more utterance candidates having calculated probabilities meeting a threshold of relevance to the dialog context. This step may be performed by processing circuitry, e.g., in the computer system 110. In determining the one or more characteristics of the dialog between the computer system and the user, the processing circuitry may determine a probability that the utterance candidate is relevant to the dialog context is at least 0.5 and update the dialog context to include the utterance candidate. To update the dialog context to include the utterance candidate, the probability that the utterance candidate is relevant to the dialog context may be at least 0.1, 0.2, 0.3, 0.4, 0.5, 0.6, 0.7, 0.8, 0.9 or more. For instance, if the probability that the utterance candidate, "food=Korean," is relevant to the dialog context, such as "what kind of food" and "I like Chinese food," is at least 0.5, then the dialog context may be updated to include "what kind of food" and "I like Korean food."

In determining the one or more characteristics of the dialog between the computer system and the user, the processing circuitry may determine a probability that the utterance candidate is relevant to the dialog context is at least 0.5 and update or replace one or more tokens of the utterance candidate to have a value matching a value determined in a previous turn. To update or replace one or more tokens of the utterance candidate to have a value matching a value determined in a previous turn, the probability that the utterance candidate is relevant to the dialog context may be at least 0.1, 0.2, 0.3, 0.4, 0.5, 0.6, 0.7, 0.8, 0.9 or more. For instance, if the probability that the utterance candidate, such as "food=Korean," is relevant to the dialog context, such as "what kind of food" and "I like Chinese food," is at least 0.5, then the one or more tokens of the utterance candidate may be updated or replaced to be "food=Chinese."

Figure 5:
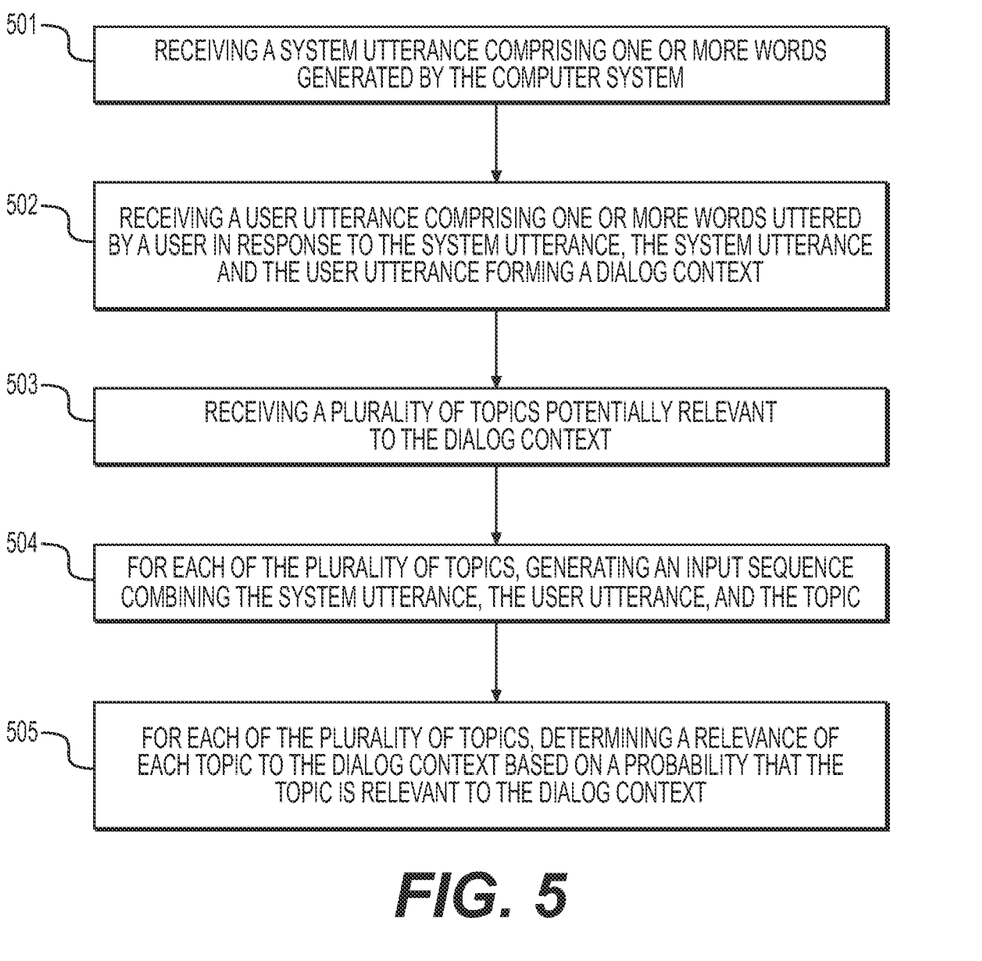
FIG. 5 depicts a flowchart of an exemplary method for determining the relevance of a topic to a dialog between a computer system and user, according to one or more embodiments.

FIG. 5 depicts a flowchart illustrating an exemplary method for determining the relevance of a topic to a dialog between a computer system and user, according to one or more embodiments of the present disclosure. The method may be performed by computer system 110.

In step 501, processing circuitry, e.g., in the computer system 110, receives a system utterance comprising one or more words generated by the computer system. System utterance may be any utterance that is provided by a machine or system (e.g., a computer system) instead by a human being (e.g., a user). In one example, if a system utterance is "What kind of food?," the system utterance may comprise four tokens, one for each of the words in the sentence of "what kind of food."

In step 502, processing circuitry, e.g., in the computer system 110, receives a user utterance comprising one or more words uttered by a user in response to the system utterance. Again, the system utterance and the user utterance may form the dialog context. In this case, a dialog context may include a plurality of utterances, including a system utterance and a user utterance. An utterance, either a system utterance or a user utterance, may include an identifiable boundary, which can be used to break multiple utterances of a dialog context into discrete utterances. In forming the dialog context, the processing circuitry may place the system utterance before the user utterance in the dialog context. In some other embodiments, the processing circuitry may place the user utterance before the system utterance to form the dialog context.

In step 503, processing circuitry, e.g., in the computer system 110 receives a plurality of topics potentially relevant to the dialog context. Each topic may be associated with one characteristic of the dialog between the computer system and the user. The characteristic of the dialog may include a state of a dialog or any subject matters associated with the dialog. The topic may be an utterance candidate. Details of the characteristics, the state of a dialog, and utterance candidate are described above, e.g., in reference to FIG. 4.

In step 504, for each of the plurality of topics, processing circuitry, e.g., in the computer system 110, generates an input sequence combining the system utterance, the user utterance, and the topic. In generating the input sequence, the processing circuitry may place the dialog context before the topic in the input sequence. In some other embodiments, the processing circuitry may place the topic before the dialog context to generate the input sequence.

In step 505, for each of the plurality of topics, processing circuitry, e.g., in the computer system 110, determines a relevance of each topic to the dialog context based on a probability that the topic is relevant to the dialog context. In determining the relevance of each topic to the dialog context, the processing circuitry may input the generated input sequence into a machine learning model and calculate the probability that the topic is relevant to the dialog context via the machine learning model. In calculating the probability that the topic is relevant to the dialog context, the processing circuitry may calculate the probability via a BERT model. Details of the BERT model are described above, e.g., in paragraphs [0030] to [0033].

The step 505 of determining the relevance of each topic to the dialog context may involve the processing circuitry i) determining a probability that the topic is relevant to the dialog context is at least 0.5 and ii) updating the dialog context to include the topic. To update the dialog context to include the utterance candidate, the probability that the topic is relevant to the dialog context may be at least 0.1, 0.2, 0.3, 0.4, 0.5, 0.6, 0.7, 0.8, 0.9 or more. For instance, if the probability that the topic, the recipe of the Chinese food, is relevant to the dialog context, such as "what kind of food" and "I like Chinese food," is at least 0.5, then the dialog context may be updated to include the recipe of the Chinese food. In determining the relevance of each topic to the dialog context, the processing circuitry may determine a probability that the topic is relevant to the dialog context is at least 0.5 and update or replace the topic to have a value matching a value determined in a previous turn. To update or replace the topic to have a value matching a value determined in a previous turn, the probability that the topic is relevant to the dialog context may be at least 0.1, 0.2, 0.3, 0.4, 0.5, 0.6, 0.7, 0.8, 0.9 or more.

In general, any process discussed in this disclosure that is understood to be computer-implementable, such as the processes illustrated in FIGS. 4 and 5, may be performed by one or more processors (i.e., processing circuitry) of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, may include one or more computing devices. If the one or more processors of the computer system 110 are implemented as a plurality of processors, the plurality of processors may be included in a single computing device or distributed among a plurality of computing devices. If a computer system 110 comprises a plurality of computing devices, the memory of the computer system 110 may include the respective memory of each computing device of the plurality of computing devices.

Figure 6:
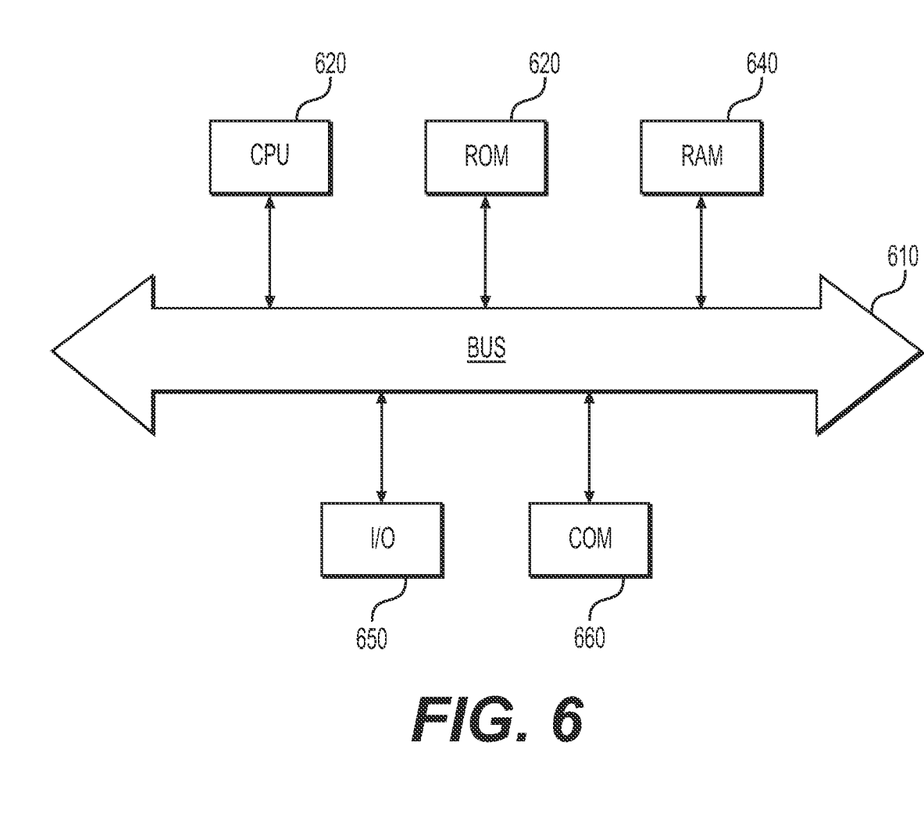
FIG. 6 depicts an example of a computing device, according to one or more embodiments.

FIG. 6 illustrates an example of a computing device 600 of a computer system, such as computer system 110 configured to implement the techniques of FIGS. 3-5. The computing device 600 may include processor(s) 610 (e.g., CPU, GPU, or other such processing unit(s)), a memory 620, and communication interface(s) 640 (e.g., a network interface) to communicate with other devices. Memory 620 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 620. The computing device 600 may, in some embodiments, further include input device(s) 650 (e.g., a keyboard, mouse, or touchscreen) and output device(s) 660 (e.g., a display, printer). The aforementioned elements of the computing device 600 may be connected to one another through a bus 630, which represents one or more busses. In some embodiments, the processor(s) 610 of the computing device 600 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and the scope of the present disclosure shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A method comprising:
   receiving, by a processing device, a system utterance and a user utterance;
   generating, by the processing device, a dialog sequence by encoding the system utterance and the user utterance into a series of vectors;
   identifying, by the processing device, a candidate topic represented as a candidate vector associated with a characteristic of the dialog sequence;
   determining, by the processing device using a machine learning model, a relevance score indicating a probability that the candidate topic is relevant to the dialog sequence by comparing the candidate vector to the series of vectors; and
   generating, by the processing device, data indicating a dialog context including the candidate topic based on the relevance score.

2. The method of claim 1, further comprising replacing the candidate topic with a different candidate topic based on the relevance score.

3. The method of claim 1, further comprising determining whether the relevance score meets a threshold of relevance to the dialog sequence.

4. The method of claim 3, further comprising updating the dialog sequence to include the candidate topic if the relevance score meets the threshold of relevance to the dialog sequence.

5. The method of claim 1, further comprising generating a response to the user utterance based on the candidate topic and the dialog sequence.

6. The method of claim 1, wherein the characteristic of the dialog sequence is a state of a dialog between a system and a user.

7. The method of claim 1, wherein each vector in the series of vectors is assigned to a word in the dialog sequence.

8. The method of claim 1, further comprising selecting the candidate topic from a plurality of potential topics.

9. The method of claim 1, wherein the probability that the candidate topic is relevant to the dialog sequence is calculated using a Bidirectional Encoder Representations from Transformers (BERT) model.

10. A system comprising:
a memory component; and
a processing device to perform operations comprising:
receiving a user utterance including user utterance tokens defining words generated by a user;
forming a dialog token sequence representing a dialog sequence by combining the user utterance tokens with system utterance tokens defining words of a system utterance generated by a computer system in response to the user utterance;
identifying a candidate topic represented as candidate topic tokens associated with a characteristic of the dialog sequence;
generating an input sequence by combining the dialog token sequence with the candidate topic tokens;
determining, using a machine learning model, a relevance score indicating a probability that the candidate topic is relevant to the dialog sequence by comparing the candidate topic tokens to the dialog token sequence; and
generating data indicating a dialog context including the candidate topic based on the relevance score.

11. The system of claim 10, wherein each token in the dialog token sequence is assigned to a word in the dialog sequence.

12. The system of claim 10, wherein the user utterance is a question and the system utterance is an answer to the question.

13. The system of claim 10, wherein the user utterance tokens and the system utterance tokens are separated with a separator token representing a start of an utterance.

14. The system of claim 10, further comprising determining whether the relevance score meets a threshold of relevance to the dialog sequence.

15. The system of claim 14, further comprising updating the dialog sequence to include the candidate topic if the relevance score meets the threshold of relevance to the dialog sequence.

16. A non-transitory computer-readable storage medium storing executable instructions, which when executed by a processing device, cause the processing device to perform operations comprising:
receiving a system utterance and a user utterance;
generating a dialog sequence by encoding the system utterance and the user utterance into a series of vectors;
identifying a candidate topic represented as a candidate vector associated with a characteristic of the dialog sequence;
determining, using a machine learning model, a relevance score indicating a probability that the candidate topic is relevant to the dialog sequence by comparing the candidate vector to the series of vectors; and
generating data indicating a dialog context including the candidate topic based on the relevance score.

17. The non-transitory computer-readable storage medium of claim 16, further comprising replacing the candidate topic with a different candidate topic based on the relevance score.

18. The non-transitory computer-readable storage medium of claim 16, wherein the characteristic of the dialog sequence is a state of a dialog between a system and a user.

19. The non-transitory computer-readable storage medium of claim 16, further comprising selecting the candidate topic from a plurality of potential topics.

20. The method of claim 1, wherein the data indicating the dialog context includes a description of the dialog sequence.

* * * * *